US012812736B2

(12) United States Patent
Kim et al.

(10) Patent No.: US 12,812,736 B2
(45) Date of Patent: Nov. 24, 2026

(54) POWER CONVERSION DEVICE, ELECTRIC RANGE INCLUDING SAME, AND CONTROL METHOD THEREFOR

(71) Applicant: COWAY CO., LTD., Gongju-si (KR)

(72) Inventors: Young Kook Kim, Gongju-si (KR); Yeon Soo Seong, Gongju-si (KR); Kyo Eon Oh, Gongju-si (KR); Eui Soon Lee, Gongju-si (KR)

(73) Assignee: COWAY CO., LTD., Gongju-si (KR)

( * ) Notice: Subject to any disclaimer, the term of this patent is extended or adjusted under 35 U.S.C. 154(b) by 862 days.

(21) Appl. No.: 18/000,467

(22) PCT Filed: May 31, 2021

(86) PCT No.: PCT/KR2021/006727
§ 371 (c)(1),
(2) Date: Dec. 1, 2022

(87) PCT Pub. No.: WO2021/246733
PCT Pub. Date: Dec. 9, 2021

(65) Prior Publication Data
US 2023/0217552 A1 Jul. 6, 2023

(30) Foreign Application Priority Data
Jun. 1, 2020 (KR) ........................ 10-2020-0065733

(51) Int. Cl.
*H05B 6/06* (2006.01)
*H02M 1/08* (2006.01)
(Continued)

(52) U.S. Cl.
CPC .............. *H05B 6/062* (2013.01); *H02M 1/08* (2013.01); *H02M 7/53871* (2013.01); *H05B 6/04* (2013.01)

(58) Field of Classification Search
CPC combination set(s) only.
See application file for complete search history.

(56) References Cited

U.S. PATENT DOCUMENTS 5,371,668 A * 12/1994 Gurwicz ........... H02M 7/53862 315/209 R
7,312,427 B2 12/2007 Suenaga et al.
(Continued)

FOREIGN PATENT DOCUMENTS

JP 2003-317922 A 11/2003
JP 4489339 B2 * 6/2010
(Continued)

OTHER PUBLICATIONS

International Search Report mailed on Sep. 17, 2021 in PCT/KR2021/006727 filed on May 31, 2021 (2 pages).
(Continued)

*Primary Examiner* — Elizabeth M Kerr
*Assistant Examiner* — Kuangyue Chen
(74) *Attorney, Agent, or Firm* — Oblon, McClelland, Maier & Neustadt, L.L.P.

(57) ABSTRACT

Disclosed are a power conversion device, an electric range including same, and a control method therefor. The electric range of the present invention comprises: a plate; a working coil; an interface unit; a voltage providing unit for providing a rectified voltage to the working coil; a first switching element; a second switching element connected in parallel with the first switching element; and a control unit, wherein the control unit determines a driving signal for driving at least one of the first switching element and the second switching element, according to the temperatures of the first switching element and the second switching element, and outputs same to the first switching element and the second switching element, and when the rectified voltage is greater than or equal to a predetermined level, the control unit provides the first switching element and the second switching element with driving signals for driving the first switching element and the second switching element, respectively, and when the rectified voltage is less than the level, the control unit transmits a driving signal to a switching element having a lower temperature among the first switching element and the second switching element, and provides an off control signal to the switching element having a higher temperature.

10 Claims, 9 Drawing Sheets

(51) Int. Cl.
*H02M 7/5387* (2007.01)
*H05B 6/04* (2006.01)

(56) References Cited

U.S. PATENT DOCUMENTS

| | | | | |
|---|---|---|---|---|
| 2006/0201937 | A1 | 9/2006 | Suenaga et al. | |
| 2016/0233858 | A1* | 8/2016 | Wasekura | H03K 17/166 |

FOREIGN PATENT DOCUMENTS

| | | | |
|---|---|---|---|
| JP | 2011-198621 | A | 10/2011 |
| JP | 2016-163486 | A | 9/2016 |
| KR | 10-2012-0124031 | A | 11/2012 |
| KR | 10-2017-0082142 | A | 7/2017 |

OTHER PUBLICATIONS

Combined Chinese Office Action and Search Report issued Oct. 27, 2025, in corresponding Chinese Patent Application No. 202180039561.0 (with English Translation of Category of Cited Documents), 10 pages.

* cited by examiner

POWER CONVERSION DEVICE, ELECTRIC RANGE INCLUDING SAME, AND CONTROL METHOD THEREFOR

TECHNICAL FIELD

The present invention relates to a power conversion device, an electric range including the same, and a method of controlling the same.

BACKGROUND ART

Power semiconductor devices such as power metal-oxide-semiconductor field-effect transistors (MOSFETs) and insulated gate bipolar transistors (IGBTs) are used to control power devices such as motor driving inverters, uninterruptible power supplies, and frequency converters.

Since a rated voltage and a rated current of the power devices tend to increase, power semiconductor devices used for the power devices require a high withstand voltage and a high current, but there is a problem in that high output cannot be maintained for a long time due to heat generation in the power semiconductor devices.

In accordance with such a trend of high withstand voltage and high current, various attempts have been made to solve a heat generation problem by connecting power semiconductor devices in parallel.

Korean Patent Publication No. 10-2017-0082142 (Switching circuit and semiconductor device) of Toyota Motor Corporation discloses a circuit structure in which IGBTs are disposed in parallel, two IGBTs are both turned on when a current flowing in a wire is greater than a threshold, and when a current flowing in the wire is less than the threshold, only one of the two IGBTs is turned on. According to such a structure, there is an effect of reducing turn-off loss when a low current flows while reducing each IGBT load when a high current flows. However, since it is impossible to reflect a state of each IGBT, there is a problem in that the durability enhancement performance of an element is degraded.

Korean Patent Publication No. 10-2012-0124031 (Power semiconductor device including a plurality of switching elements connected in parallel) of Mitsubishi Electric Corporation discloses a circuit structure in which power semiconductors are disposed in parallel, and two elements are turned on at the same time or at mutually different timings according to an on command and are turned off at mutually different timings according to an off command. According to such a structure, there is an effect of reducing switching loss as compared with the related art. However, even in this case, since it is impossible to reflect each state of a semiconductor element, there is a problem in that the durability enhancement performance of an element is degraded.

DISCLOSURE

Technical Problem

The present invention is directed to connecting switching elements in parallel and dividing a current flowing in the switching elements according to a state of the switching elements to reduce heat generated in the switching elements and increase a high power maintaining time.

Technical Solution

According to an embodiment of the present invention, an electric range includes a plate on which an object to be heated is seated, a working coil disposed under the plate and configured to heat the object to be heated using an induced current, an interface unit configured to receive a selection of a user, a voltage providing unit configured to provide a rectified voltage to the working coil, a first switching element switched to apply the rectified voltage to the working coil, a second switching element connected parallel to the first switching element, and a control unit configured to control the first switching element and the second switching element according to the selection of the user received through the interface unit, wherein the control unit determines a driving signal for driving at least one of the first switching element and the second switching element according to temperatures of the first switching element and the second switching element and outputs the driving signal to the first switching element and the second switching element, and when the rectified voltage has a level that is a certain level or higher, the control unit provides the driving signal for driving each of the first switching element and the second switching element to the first switching element and the second switching element, and when the rectified voltage has a level that is less than the certain level, the control unit transmits the driving signal to a switching element having a low temperature among the first switching element and the second switching element and provides an off control signal to a switching element having a high temperature.

When the rectified voltage has a level that is less than the certain level and the temperatures of the first switching element and the second switching element are the same, the control unit may transmit the driving signal to any switching element and may provide the off control signal to another switching element.

According to another embodiment of the present invention, an electric range includes a plate on which an object to be heated is seated, a working coil disposed under the plate and configured to heat the object to be heated using an induced current, an interface unit configured to receive a selection of a user, a voltage providing unit configured to provide a rectified voltage to the working coil, a first switching element switched to apply the rectified voltage to the working coil, a second switching element connected parallel to the first switching element, and a control unit configured to control the first switching element and the second switching element according to the selection of the user received through the interface unit, wherein the control unit determines a driving signal for driving at least one of the first switching element and the second switching element according to currents flowing in the first switching element and the second switching element and outputs the driving signal to the first switching element and the second switching element, and when the rectified voltage has a level that is a certain level or higher, the control unit provides the driving signal for driving each of the first switching element and the second switching element to the first switching element and the second switching element, and when the rectified voltage has a level that is less than the certain level, the control unit transmits the driving signal to a switching element in which a low current flows among the first switching element and the second switching element and provides an off control signal to a switching element in which a large current flows.

When the rectified voltage has a level that is less than the certain level and the currents flowing in the first switching element and the second switching element are the same, the control unit may transmit the driving signal to any switching element and may provide the off control signal to another switching element.

According to another embodiment of the present invention, a power conversion device which performs switching to output an input voltage includes a first switching element configured to constitute an arm element of the power conversion device, a second switching element connected parallel to the first switching element, and a control unit configured to determine a driving signal for driving at least one of the first switching element and the second switching element according to temperatures of the first switching element and the second switching element and output the driving signal to the first switching element and the second switching element, wherein, when the input voltage has a level that is a certain level or higher, the control unit provides the driving signal for driving each of the first switching element and the second switching element to the first switching element and the second switching element, and when the input voltage has a level that is less than the certain level, the control unit transmits the driving signal to a switching element having a low temperature among the first switching element and the second switching element and provides an off control signal to a switching element having a high temperature.

The rectified voltage has a level that is less than the certain level and the temperatures of the first switching element and the second switching element are the same, the control unit may transmit the driving signal to any switching element and may provide the off control signal to another switching element.

According to still another embodiment of the present invention, a power conversion device which performs switching to output an input voltage includes a first switching element configured to constitute an arm element of the power conversion device, a second switching element connected parallel to the first switching element, and a control unit configured to determine a driving signal for driving at least one of the first switching element and the second switching element according to currents flowing in the first switching element and the second switching element and output the driving signal to the first switching element and the second switching element, wherein, when the input voltage has a level that is a certain level or higher, the control unit provides the driving signal for driving each of the first switching element and the second switching element to the first switching element and the second switching element, and when the input voltage has a level that is less than the certain level, the control unit transmits the driving signal to a switching element in which a low current flows among the first switching element and the second switching element and provides an off control signal to a switching element in which a large current flows.

When the rectified voltage has a level that is less than the certain level and the currents flowing in the first switching element and the second switching element are the same, the control unit may transmit the driving signal to any switching element and may provide the off control signal to another switching element.

According to still another embodiment of the present invention, a method of controlling a power conversion device for an electric range, which includes a working coil, a voltage providing unit configured to provide a rectified voltage, a first switching element switched to apply the rectified voltage to the working coil, and a second switching element connected parallel to the first switching element, includes, when the rectified voltage has a level that is a certain level or higher, providing a driving signal for driving each of the first switching element and the second switching element to the first switching element and the second switching element, and when the rectified voltage has a level that is less than the certain level, transmitting the driving signal to a switching element having a low temperature among the first switching element and the second switching element and providing an off control signal to a switching element having a high temperature.

According to yet another embodiment of the present invention, a method of controlling a power conversion device for an electric range, which includes a working coil, a voltage providing unit configured to provide a rectified voltage, a first switching element switched to apply the rectified voltage to the working coil, and a second switching element connected parallel to the first switching element, includes, when the rectified voltage has a level that is a certain level or higher, providing a driving signal for driving each of the first switching element and the second switching element to the first switching element and the second switching element, and when the rectified voltage has a level that is less than the certain level, transmitting the driving signal to a switching element in which a low current flows among the first switching element and the second switching element and providing an off control signal to a switching element in which a large current flows.

Advantageous Effects

As described above, in the present invention, when an applied voltage has a level that is a certain level or higher, all switching elements connected in parallel are driven to respond to a high voltage, and when the applied voltage has a level that is less than the certain level, only a switching element having a low temperature among the switching elements connected in parallel is driven to divide a current flowing in the switching element, thereby reducing the heat generated in the switching elements and increasing a high output maintaining time.

In addition, when an applied voltage has a level that is a certain level or higher, all switching elements connected in parallel are driven to respond to a high voltage, and when the applied voltage has a level that is less than the certain level, only a switching element in which a low current flows among the switching elements connected in parallel is driven to divide a current flowing in the switching elements, thereby reducing the heat generated in the switching elements and increasing a high output maintaining time.

DESCRIPTION OF DRAWINGS

FIG. 11 illustrates a configuration of an inverter circuit in which switching elements are disposed in parallel according to another embodiment of the present invention.

MODES OF THE INVENTION

In order to fully understand the configuration and effects of the present invention, exemplary embodiments of the present invention will be described with reference to the accompanying drawings. However, the present invention is not limited to the embodiments disclosed herein, and may be implemented in various forms and may be modified in various ways. Rather, the description of the embodiments is provided only to make the present invention complete, and to fully inform the scope of the present invention to those skilled in the art. In the accompanying drawings, for convenience of description, the size of the components is illustrated to be larger than the actual size, and the ratio of each component may be exaggerated or reduced.

Terms such as "first" and "second" may be used to describe various components, but the components should not be limited by the terms. The terms may be used only for the purpose of distinguishing one component from another component. For example, without departing from the scope of the present invention, a first component may be referred to as a second component, and similarly, the second component may also be referred to as the first component. Singular expressions may include plural expressions unless the context clearly indicates otherwise. The terms used in the embodiments of the present invention have the same meanings as terms that are generally understood by those skilled in the art, as long as the terms are not explicitly defined differently.

Hereinafter, an electric range 100 of one embodiment of the present invention will be described with reference to the accompanying drawings.

Figure 1:
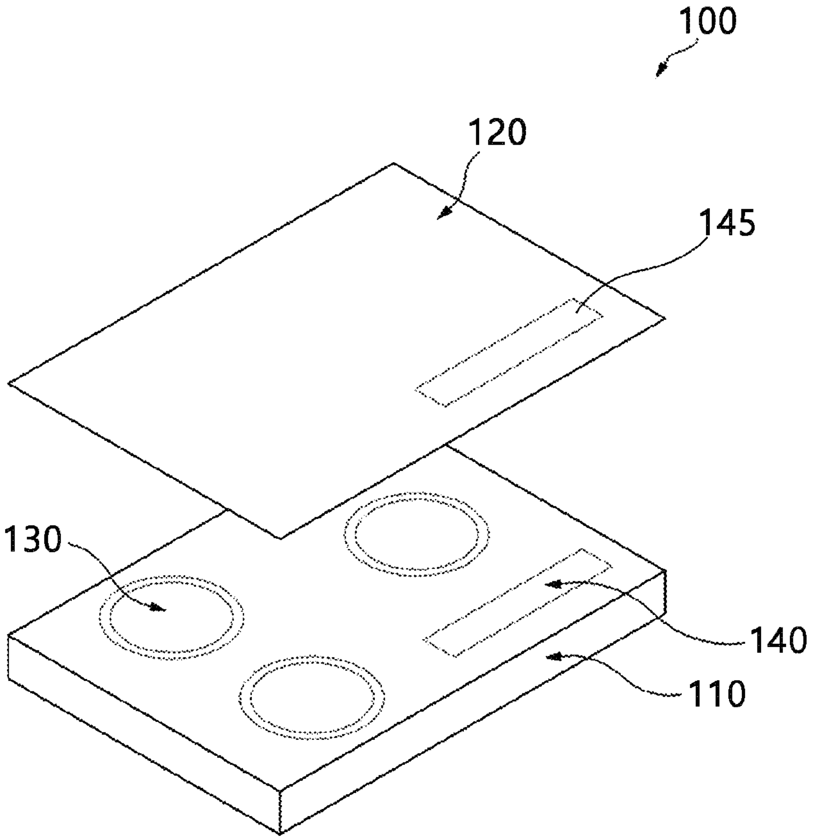
FIG. 1 is a view of a configuration of an electric range according to one embodiment of the present invention.

FIG. 1 is a view of a configuration of the electric range according to one embodiment of the present invention.

Referring to FIG. 1, the electric range 100 of one embodiment of the present invention may include a case 110 constituting a main body and a cover plate 120 coupled to the case 110 to seal the case 110.

The cover plate 120 may be coupled to an upper surface of the case 110 to seal a space formed inside the case 110 from the outside and may be made of a material (for example, ceramic glass) capable of transferring heat generated from a heating unit 130 to an object to be heated disposed in a region corresponding to the heating unit 130 well.

A plurality of heating units 130 for heating an object to be heated may be disposed in the case 110. In addition, an interface unit 140 may be disposed on the upper surface of the case 110 to allow a user to apply power or adjust the output of the heating unit 130 or to display information related to the electric range 100. The interface unit 140 may be formed as a touch panel allowing information to be input and displayed through a touch. The interface unit 140 may also be used with a different structure according to embodiments.

In the description of the present invention, an example in which the heating unit 130 and the interface unit 140 are disposed in the case 110 is described, but this is merely exemplary, and it is obvious that a plurality of other components for driving the electric range 100 may be disposed.

The cover plate 120 may include a manipulation region 145 disposed at a position corresponding to the interface unit 140. For user manipulation, text or images may be pre-printed in the manipulation region 145. A user may perform a desired manipulation by touching a specific point of the manipulation region 145 with reference to the pre-printed characters or images. Also, information output by the interface unit 140 may be displayed through the cover plate 120.

Although an example in which three heating units 130 are disposed inside the case 110 is shown in the embodiment of FIG. 1, in another embodiment of the present invention, inside the case 110, one or two heating units may be disposed, or three or more heating units may be disposed. In addition, although a schematic structure of the electric range 100 is shown in FIG. 1, it is obvious that various configurations may be included in the electric range 100.

In one embodiment of the present invention, the heating unit 130 may include a working coil that forms an induced magnetic field using a supplied high-frequency alternating current (AC) current. That is, when a high-frequency current flows through the working coil, a magnetic field is formed in the working coil, and the magnetic field generates an eddy current in a cooking vessel magnetically coupled to the working coil, thereby heating an object to be heated and cooking food. In this case, the electric range 100 may be an induction heating type cooking appliance. Alternatively, the heating unit 130 may also include a heating wire for heating the cover plate 120. That is, when power is applied to the heating wire, heat may be emitted to heat an object to be heated seated on the cover plate 120 to cook food. In this case, the electric range 100 may be a highlight type cooking appliance. As described above, the electric range 100 of the present invention may be the induction heating type cooking device or the highlight type cooking device. Hereinafter, an embodiment in which the heating unit 130 is the working coil will be described.

Referring again to FIG. 1, a control unit to be described below may be disposed in a space formed inside the case 110 to receive a user input through the interface unit 140 and control a switching element to be described below to be turned on/off according to the user input, thereby controlling the supply of power to the working coil 2.

Hereinafter, the operation of an inverter for applying power to the heating unit 130, which is the working coil, will be described with reference to the accompanying drawings.

Figure 2:
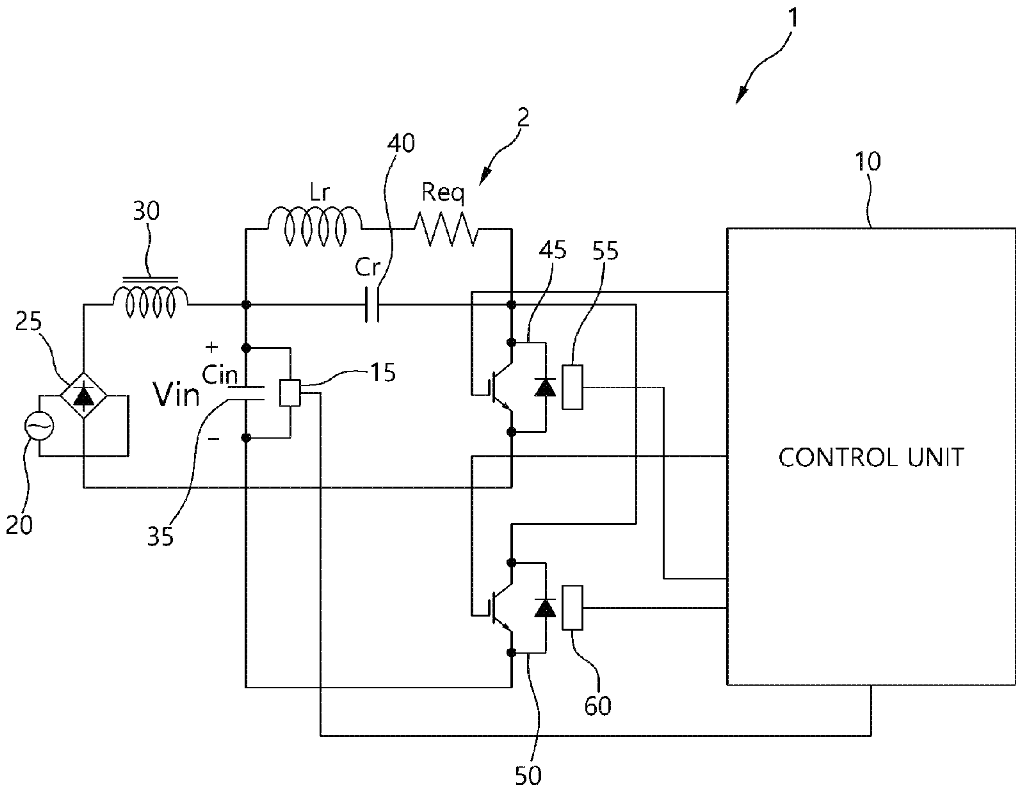
FIG. 2 is a schematic circuit diagram for describing a configuration of an inverter for applying power to a working coil according to one embodiment of the present invention.

FIG. 2 is a schematic circuit diagram for describing a configuration of an inverter for applying power to a working coil of one embodiment of the present invention.

As shown in the drawing, an inverter 1 according to one embodiment of the present invention may include a control unit 10, a voltage detection unit 15, a rectification unit 25, a choke coil 30, a voltage providing unit 35, a resonance capacitor 40 connected parallel to a working coil 2, a first switching element 45, a first temperature sensor 55, a second switching element 50 connected parallel to the first switching element 45, and a second temperature sensor 60.

Such a single-ended type inverter generates voltage resonance by inserting the resonance capacitor 40 to be parallel to the working coil 2, a high resonance voltage is generated. Since the magnitude of a resonant voltage is designed to be about 700 V, a voltage applied to both ends of each of the first switching element 45 and the second switching element

50 exceeds 1,000 V. Therefore, as the first switching element 45 and the second switching element 50 used in the inverter having such a structure, a high withstand voltage insulated gate bipolar transistor (IGBT) having a rated voltage of 1,200 V or more may be used, but the present invention is not limited thereto, and various power semiconductor elements may be used.

The rectification unit 25 may rectify an AC voltage supplied from an AC power source 20 to output a rectified voltage. The choke coil 30 may smooth the rectified voltage to remove a ripple included in the rectified voltage. That is, the choke coil 30 is connected for the purpose of blocking a high-frequency signal having a certain frequency or higher, and another element for performing such a function may also be disposed.

The voltage providing unit 35 may function as a power source for applying a rectified voltage to the working coil 2. The voltage providing unit 35 may be provided as a direct current (DC) link capacitor. In the single-ended type inverter, a small capacity capacitor may be used to obtain a high power factor only by operating the inverter without a separate power factor correction circuit, and thus a DC link voltage may have an unsmoothed pulsating wave.

Figure 3:
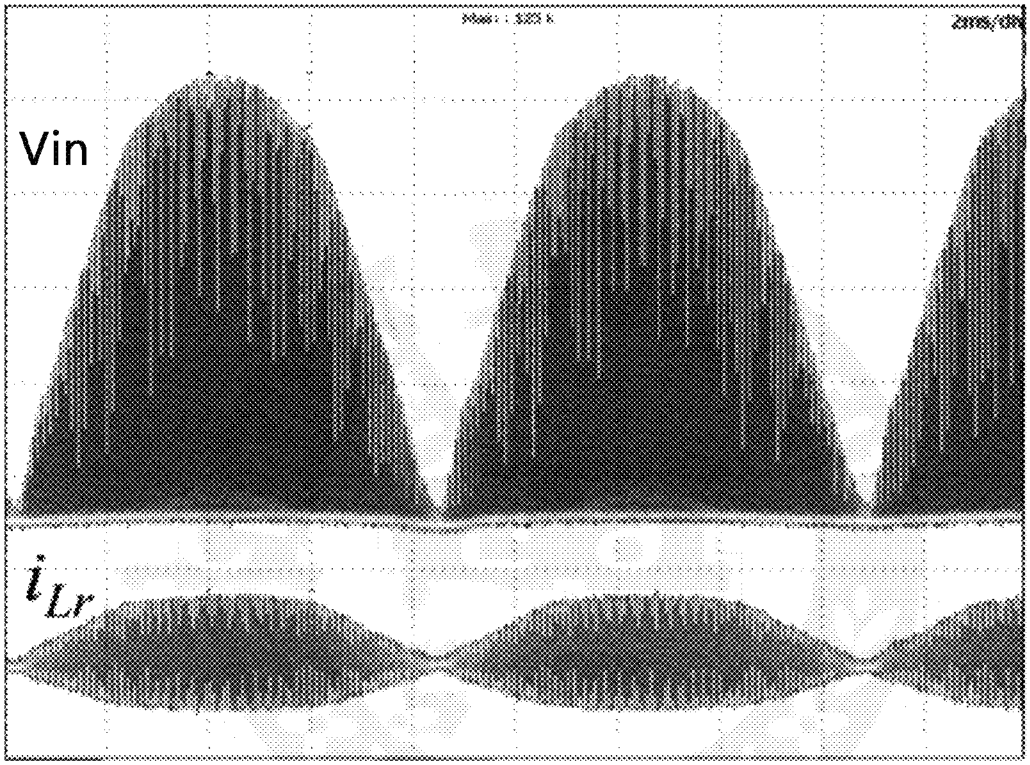
FIG. 3 shows a waveform of a rectified voltage provided to a working coil and a waveform of a current applied to the working coil by a voltage providing unit according to one embodiment of the present invention.

FIG. 3 shows a waveform of a rectified voltage provided to the working coil 2 and a waveform of a current applied to the working coil by the voltage providing unit 35 in one embodiment of the present invention. As shown in the drawing, it can be seen that a DC link voltage provided by the voltage providing unit 35 is an unsmoothed rectified voltage, and a current is proportional to the DC link voltage. The voltage detection unit 15 may provide a voltage level of the voltage providing unit 35 to the control unit 10.

In one embodiment of the present invention, the first switching element 45 and the second switching element 50 that perform an on/off operation under the control of the control unit 10 may be connected in parallel such that the rectified voltage of the voltage providing unit 35 is applied to the working coil 2. Due to such a structure, a current flowing in an element can be divided to reduce the heat generated in the element and increase an output maintaining time. In the embodiment of the present invention, although an example in which the first switching element 45 and the second switching element 50 are connected in parallel has been described, the present invention is not limited thereto, and a larger number of switching elements may be connected in parallel according to the capacity of a circuit.

The first temperature sensor 55 may be disposed near the first switching element 45 to detect a temperature of the first switching element 45 and provide the detected temperature to the control unit 10. In addition, the second temperature sensor 60 may be disposed near the second switching element 50 to detect a temperature of the second switching element 50 and provide the detected temperature to the control unit 10.

The control unit 10 may generate and output a driving signal for turning the first switching element 45 and the second switching element 50 on or off. In this case, the driving signal may be, for example, a gate driving signal for an IGBT. The first switching element 45 and the second switching element 50 receiving the driving signal are switched on or off based on the corresponding driving signal, and thus a rectified voltage may be applied to the working coil 2.

In this case, when a driving signal designated as on is applied from the control unit 10, the first switching element 45 or the second switching element 50 may be turned on, and a rectified voltage may be supplied from the voltage control unit 35 to the working coil 2. In addition, when a driving signal designated as off is applied from the control unit 10, the first switching element 45 or the second switching element 50 is turned off, the supply of the rectified voltage from the voltage control unit 35 to the working coil 2 is stopped, and an equivalent inductor Lr of the working coil 2 and the resonance capacitor (Cr) 40 resonate in parallel. Due to the first switching element 45 or the second switching element 50 being periodically turned on or off, heat may be transferred to an object to be heated of the cover plate 120 by an induced current generated in the working coil 2.

When a rectified voltage provided by the voltage providing unit 35 has a level that is a certain level or higher, the control unit 10 according to one embodiment of the present invention may transmit a driving signal for driving both the first switching element 45 and the second switching element 50 connected in parallel. In addition, when a rectified voltage provided by the voltage providing unit 35 has a level that is less than the certain level, the control unit 10 may transmit a control signal for turning off a switching element having a higher temperature among the first switching element 45 and the second switching element 50 and may transmit a driving signal for designating another switching element to be turned on or off. In this case, the certain level may be a preset value, for example, a level of 70% of a rated voltage. However, the present invention is not limited thereto, and the certain level may be set in various ways.

Hereinafter, the operation of the control unit 10 will be described with reference to the accompanying drawing.

Figure 4:
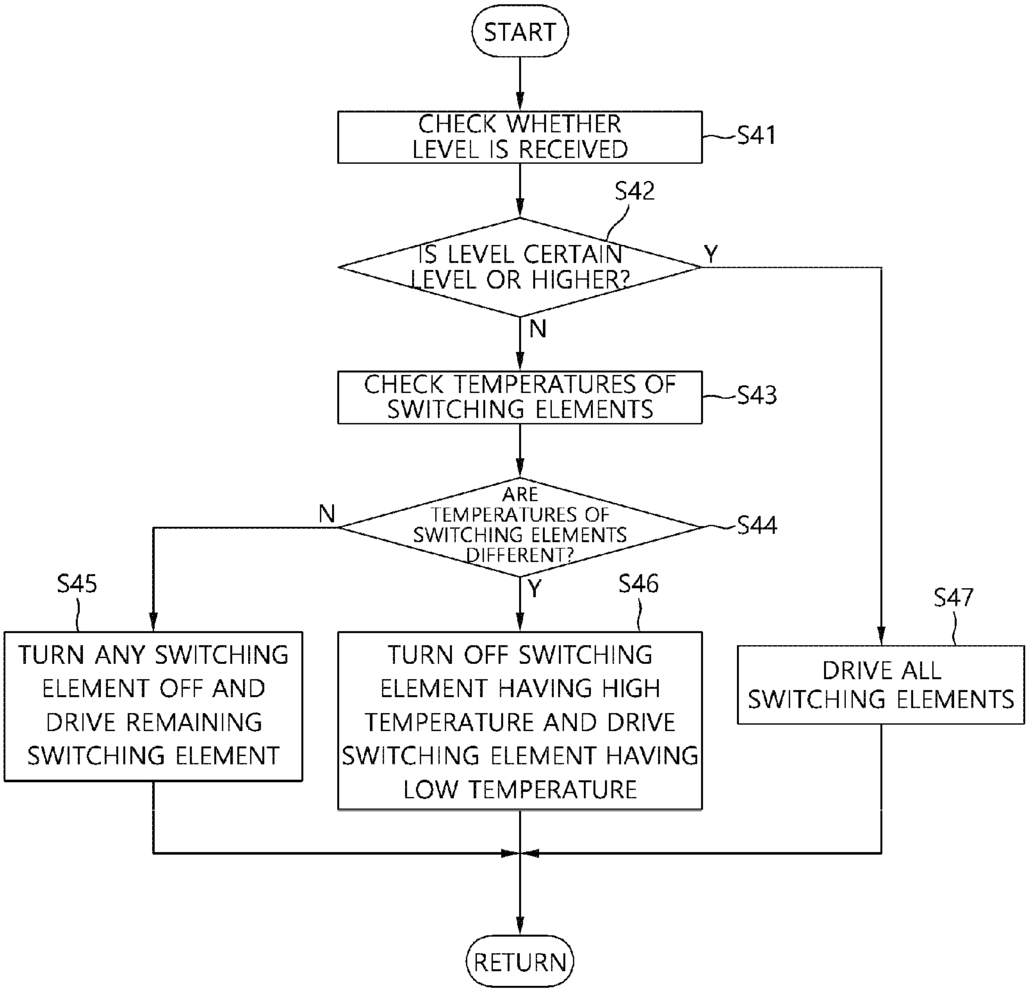
FIG. 4 is a flowchart for describing the operation of a control unit of FIG. 2.

FIG. 4 is a flowchart for describing the operation of the control unit of FIG. 2.

As shown in the drawing, the control unit 10 according to one embodiment of the present invention may check a level of a rectified voltage of the voltage providing unit 35 received from the voltage detection unit 15 connected to the voltage providing unit 35. As shown in FIG. 3, it can be seen that a voltage applied from the voltage providing unit 35 is a rectified voltage, and the magnitude of the voltage is periodically changed according to a certain period.

The control unit 10 may check whether the voltage provided by the voltage providing unit 35 has a level that is a certain level or higher (for example, 70% or more of a rated voltage, but the present invention is not limited thereto) (S42), and when the voltage provided by the voltage providing unit 35 has a level that is the certain level or higher, the control unit 10 may transmit a driving signal for designating both the first switching element 45 and the second switching element 50 connected in parallel to be turned on or off (S47). That is, the control unit 10 may transmit a driving signal for designating both the first switching element 45 and the second switching element 50 to be periodically turned on or off to the first switching element 45 and the second switching element 50.

Meanwhile, when the voltage provided by the voltage providing unit 35 has a level that is less than the certain level, the control unit 10 may check a temperature of each of the first switching element 45 and the second switching element 50 (S43). In this case, the control unit 10 may receive temperature information of the first switching element 45 from the first temperature sensor 55 periodically or in real time and may also receive temperature information of the second switching element 50 from the second temperature sensor 60 periodically or in real time.

When temperatures of both the switching elements 45 and 50 are different (S44), the control unit 10 may provide a driving signal to a switching element having a low temperature and a control signal for turning off a switching element having a high temperature (S46). For example, when the temperature of the first switching element 45 is higher than the temperature of the second switching element 50, a control signal for turning the first switching element 45 off may be provided to the first switching element 45 to control the first switching element to not be driven, and a driving signal may be provided to the second switching element 50 to periodically turn the second switching element 50 on or off and control a voltage of the voltage providing unit 35 to be applied to the working coil 2.

When the voltage provided by the voltage providing unit 35 has a level that is less than the certain level and the temperatures of both switching elements 45 and 50 are not different (substantially the same), the control unit 10 may provide a driving signal to any switching element and may provide a control signal for turning another switching element off (S45). Accordingly, even though the temperatures of the switching elements 45 and 50 are not different, when a voltage provided by the voltage providing unit 35 has a level that is less than the certain level, only one switching element may be controlled to operate.

Such control of the control unit 10 may be repeatedly performed at a certain period. That is, since a rectified voltage provided by the voltage providing unit 35 is a voltage having a certain period, the operation of the control unit 10 of FIG. 4 may be repeatedly performed according to the period of the rectified voltage provided by the voltage providing unit 35.

As described above, in one embodiment of the present invention, when an applied voltage has a level that is a certain level or higher, all switching elements connected in parallel may be driven to respond to a high voltage, and when the applied voltage has a level that is less than the certain level, only a switching element having a low temperature among the switching elements connected in parallel is driven to divide a current flowing in the switching elements, thereby reducing the heat generated in the switching elements and increasing a high output maintaining time.

Figure 5:
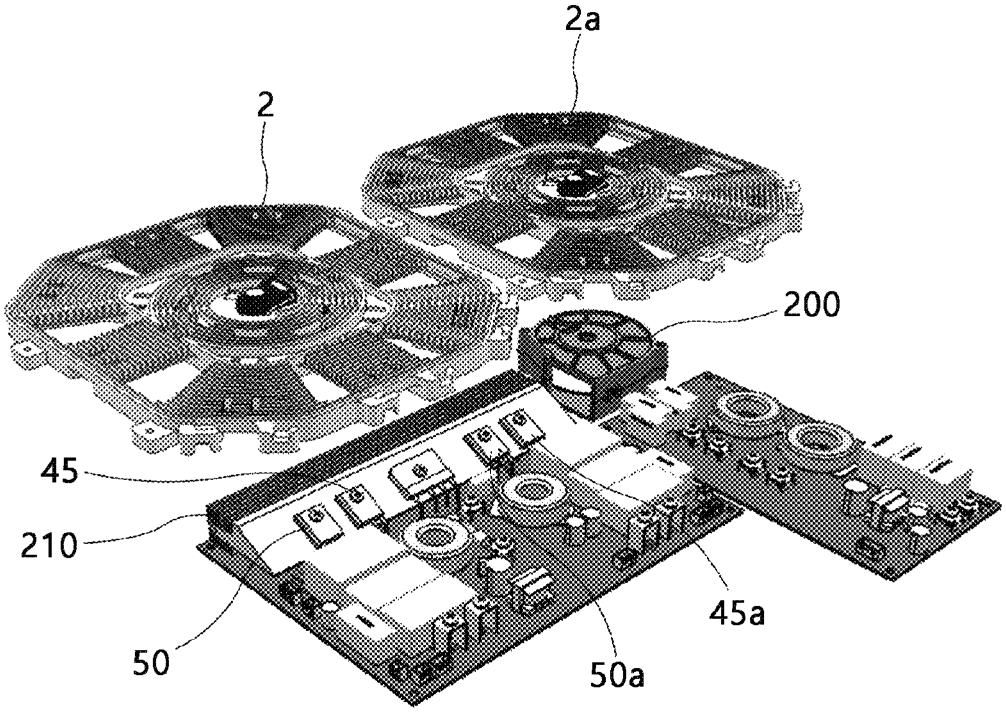
FIG. 5 is an exemplary view for describing an example in which a switching element is disposed inside an electric range according to one embodiment of the present invention.

FIG. 5 is an exemplary view for describing an example in which a switching element is disposed inside an electric range 100 and specifically illustrates an internal structure of the case 110 according to one embodiment of the present invention.

As shown in the drawing, a first switching element 45 and a second switching element 50 connected to a first working coil 2 may be connected in parallel, and a third switching element 45*a* and a fourth switching element 50*a* connected to a second working coil 2*a* may be connected in parallel. In addition, a fan 200 and a heat sink 210 may be disposed inside the case 110 of an electric range 100 to dissipate heat of the switching elements.

However, since it is impossible to arrange a plurality of fans 200 due to a spatial limitation, even when heat is dissipated at the same level by the heat sink 210, a temperature of a switching element positioned far from the fan 200 may increase. When the temperature of the switching element increases, a problem in maintaining high output for a long time may occur as described above.

In the present invention, in the electric range 100 having such a structure, when a level of a voltage applied to the working coil 2 is less than a certain level, only a switching element having a low temperature (that is, disposed close to the fan 200) is driven to reduce the stress of a switching element having a high temperature, and thus the electric range 100 can be stably used.

Figure 6:
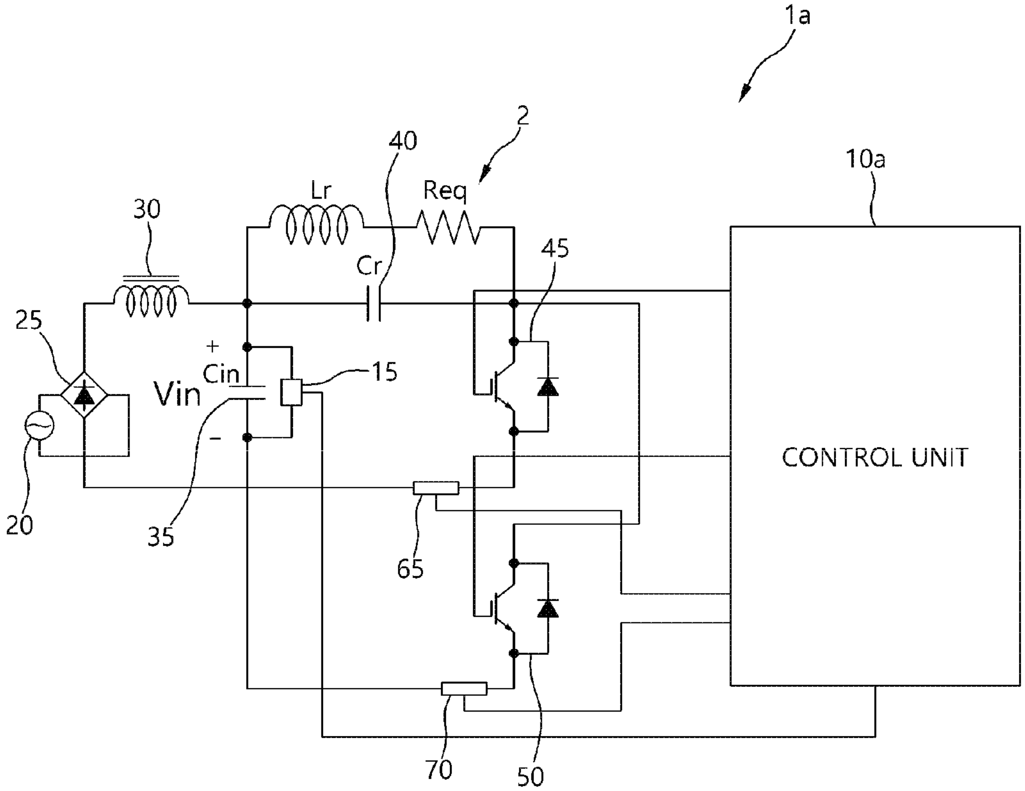
FIG. 6 is a schematic circuit diagram for describing a configuration of an inverter for applying power to a working coil according to another embodiment of the present invention.

FIG. 6 is a schematic circuit diagram for describing a configuration of an inverter for applying power to a working coil of another embodiment of the present invention.

As shown in the drawing, an inverter 1*a* according to another embodiment of the present invention may include a control unit 10*a*, a voltage detection unit 15, a rectification unit 25, a choke coil 30, a voltage providing unit 35, a resonance capacitor 40 connected parallel to a working coil 2, a first switching element 45, a first current sensor 65, a second switching element 50 connected parallel to the first switching element 45, and a second current sensor 70.

The inverter 1*a* of another embodiment of the present invention includes the first current sensor 65 and the second current sensor 70 instead of a first temperature sensor 55 and a second temperature sensor 60. Except for the operation of the control unit 10*a*, the first current sensor 65, and the second current sensor 70, other components will be the same, and thus detailed description of the remaining components will be omitted.

The first current sensor 65 may detect a current flowing in the first switching element 45 to provide a detection result to the control unit 10*a* periodically or in real time. The first current sensor 65 may be, for example, a current transformer type current sensor or a shunt resistor type current sensor, but the present invention is not limited thereto, and various types of current sensors may be used.

The second current sensor 70 may also detect a current flowing in the second switching element 50 to provide a detection result to the control unit 10*a* periodically or in real time. The second current sensor 70 may be a current transformer type current sensor or a shunt resistor type current sensor or may be a current sensor of another type.

When a rectified voltage provided by the voltage providing unit 35 has a level that is a certain level or higher, the control unit 10*a* according to another embodiment of the present invention may transmit a driving signal for driving both the first switching element 45 and the second switching element 50 connected in parallel. In addition, when a rectified voltage provided by the voltage providing unit 35 has a level that is less than the certain level, the control unit 10*a* may transmit a control signal for turning off a switching element in which a higher current flows among the first switching element 45 and the second switching element 50 and may transmit a driving signal for designating another switching element to be turned on or off. In this case, the certain level may be a preset value, for example, a level of 70% of a rated voltage. However, the present invention is not limited thereto, and the certain level may be set in various ways.

Hereinafter, the operation of the control unit 10*a* will be described with reference to the accompanying drawing.

Figure 7:
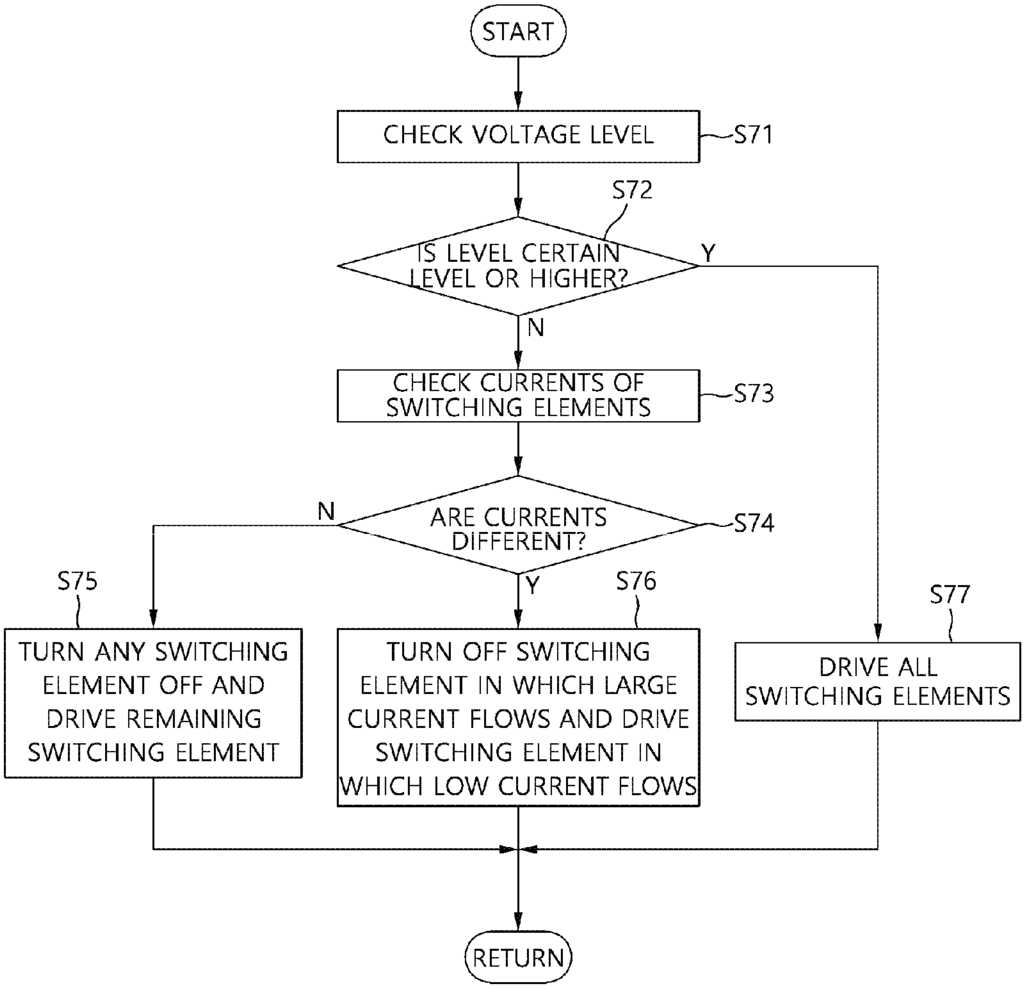
FIG. 7 is a flowchart for describing the operation of a control unit of FIG. 6.

FIG. 7 is a flowchart for describing the operation of the control unit of FIG. 6.

As shown in the drawing, the control unit 10*a* according to another embodiment of the present invention may check a level of a rectified voltage of the voltage providing unit 35 received from the voltage detection unit 15 connected to the voltage providing unit 35 (S71). As shown in FIG. 3, it can be seen that a voltage applied from the voltage providing unit 35 is a rectified voltage, and the magnitude of the voltage is periodically changed according to a certain period.

The control unit 10*a* may check whether the voltage provided by the voltage providing unit 35 has a level that is greater than a certain level (for example, 70% or more of a rated voltage, but the present invention is not limited thereto) (S72), and when the voltage provided by the voltage providing unit 35 has a level that is the certain level or higher, the control unit 10 may transmit a driving signal for driving both the first switching element 45 and the second switching element 50 connected in parallel (S77). That is, the control unit 10*a* may transmit a driving signal for designating both the first switching element 45 and the second switching element 50 to be periodically turned on or off to each of the first switching element 45 and the second switching element 50.

Meanwhile, when the voltage provided by the voltage providing unit 35 has a level that is less than the certain level, the control unit 10*a* may check a current flowing in each of the first switching element 45 and the second switching element 50 (S73). In this case, the control unit 10*a* may receive information about a current flowing in the first switching element 45 from the first current sensor 65 periodically or in real time and may also receive information about a current flowing in the second switching element 50 from the second current sensor 70 periodically or in real time.

When the currents flowing in both the switching elements 45 and 50 are different (S74), the control unit 10*a* may provide a driving signal to a switching element in which a low current flows and may provide a control signal for turning off a switching element in which a large current flows (S76). For example, when the current flowing in the first switching element 45 is higher than the current flowing in the second switching element 50, a control signal for turning the first switching element 45 off may be provided to the first switching element 45 to control the first switching element to not be driven, and a driving signal may be provided to the second switching element 50 to periodically turn the second switching element 50 on or off and control a voltage of the voltage providing unit 35 to be applied to the working coil 2.

When the voltage provided by the voltage providing unit 35 has a level that is less than the certain level and the currents flowing in both the switching elements 45 and 50 are not different (substantially the same), the control unit 10*a* may provide a driving signal to any switching element and may provide a control signal for turning another switching element off (S75). Accordingly, even though the currents flowing in the switching elements 45 and 50 are not different, when the voltage provided by the voltage providing unit 35 has a level that is less than the certain level, only one switching element may be controlled to operate.

Such control of the control unit 10*a* may be repeatedly performed at a certain period. That is, since a rectified voltage provided by the voltage providing unit 35 is a voltage having a certain period, the operation of the control unit 10 of FIG. 7 may be repeatedly performed according to the period of the rectified voltage provided by the voltage providing unit 35.

As described above, according to another embodiment of the present invention, when an applied voltage has a level that is a certain level or higher, all switching elements connected in parallel may be driven to respond to a high voltage, and when the applied voltage has a level that is less than the certain level, only a switching element in which a low current flows among the switching elements connected in parallel is driven to divide a current flowing in the switching element, thereby reducing the heat generated in the switching element and increasing a high output maintaining time.

Meanwhile, although it has been described that the control of the present invention is applied to the switching element of the single-ended type inverter of FIGS. 2 and 6, the present invention is not limited thereto, and the control of the present invention is applicable to inverters having various topologies.

Figure 8:
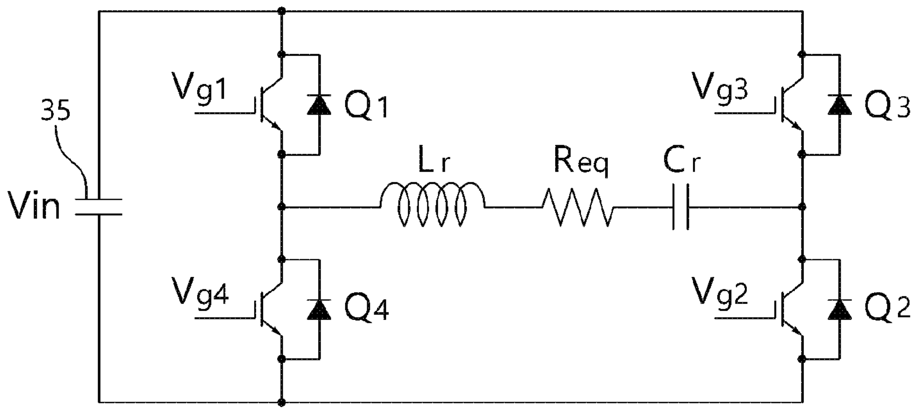
FIG. 8 is a circuit diagram of a full-bridge type inverter.
Figure 9:
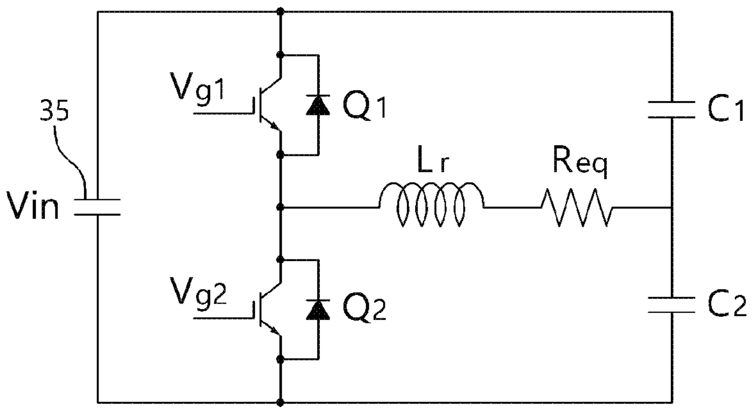
FIG. 9 is a circuit diagram of a half-bridge type inverter.

FIG. 8 is a circuit diagram of a full-bridge type inverter, and FIG. 9 is a circuit diagram of a half-bridge type inverter.

The full-bridge type inverter of FIG. 8 includes a total of four switching elements and includes an L-R-C resonant circuit in which an inductor, a resistor, and a capacitor are connected in series. In the full-bridge type inverter, since two switching elements constituting each arm perform a complementary switching operation, a voltage of a voltage providing unit 35 may be directly transmitted to the resonant circuit. In the half-bridge type inverter of FIG. 9, two switching elements constituting an arm are individually turned on or off to apply a voltage to a resonance circuit.

According to one embodiment of the present invention, switching elements are disposed in parallel in inverter circuits having various topologies, thereby reducing the heat generation of the switching elements and maintaining high output power for a long time.

However, a control device of one embodiment of the present invention is not limited to a resonance type inverter and may be used in various topologies for supplying power for driving an electric motor.

Figure 10:
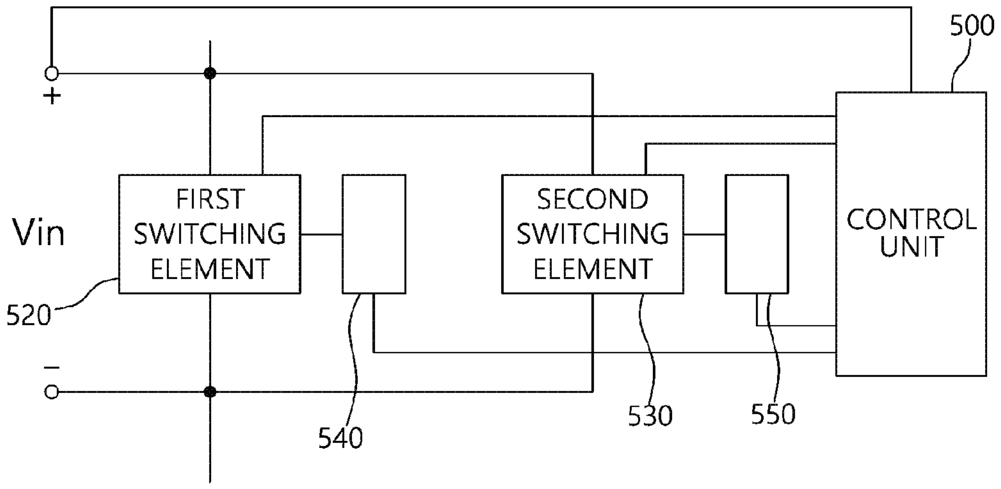

FIG. 10 illustrates a configuration of an inverter circuit in which switching elements are disposed in parallel according to one embodiment of the present invention. FIG. 10 illustrates a portion of the entire inverter circuit as in FIG. 8 or 9.

As shown in the drawing, an inverter device according to one embodiment of the present invention may include a first switching element 520 and a second switching element 530 connected in parallel, a first temperature sensor 540, a second temperature sensor 550, and a control unit 500.

In one embodiment of the present invention, the first switching element 520 and the second switching element 530 constitute an inverter having a certain topology, and although not shown in the drawing, the first switching element 520 and the second switching element 530 may also be used in the full-bridge type inverter of FIG. 8 or the half-bridge type inverter of FIG. 9.

The first switching element 520 and the second switching element 530 may be connected in parallel, and an input voltage of the first switching element 520 and the second switching element 530 may be a rectified voltage described with reference to FIG. 2 or may be an unrectified AC voltage. When the input voltage is the unrectified AC voltage, the control unit 500 may determine a level of an absolute value of the input voltage.

The first temperature sensor 540 may be disposed near the first switching element 520 or connected to the first switching element 520 to detect a temperature of the first switching element 540 and provide the detected temperature to the control unit 500 periodically or in real time. In addition, the second temperature sensor 550 may be disposed near the second switching element 530 or connected to the second switching element 530 to detect a temperature of the second switching element 530 and provide the detected temperature to the control unit 500.

The control unit 500 may generate and output a driving signal for turning the first switching element 520 and the second switching element 530 on or off. In this case, the driving signal may be, for example, a gate driving signal for an IGBT. The first switching element 520 and the second switching element 530 receiving the driving signal are switched on or off based on the corresponding driving signal.

The control unit 500 may check input voltages of the first switching element 520 and the second switching element 530, and when the input voltage has a level that is a certain level or higher, the control unit 500 may transmit a driving signal for driving both the first switching element 520 and the second switching element 530 connected in parallel. In addition, when the input voltage has a level that is less than the certain level, the control unit 500 may transmit a control signal for turning off a switching element having a higher temperature among the first switching element 520 and the second switching element 530 and may transmit a driving signal for designating another switching element to be turned on or off. In this case, the certain level may be a preset value, for example, a level of 70% of a rated voltage. However, the present invention is not limited thereto, and the certain level may be set in various ways.

Specifically, the control unit 500 of one embodiment of the present invention may check a level of an input voltage, and when the input voltage has a level that is the certain level or higher, the control unit 500 may transmit a driving signal for designating both the first switching element 520 and the second switching element 530 to be periodically turned on or off to each of the first switching element 520 and the second switching element 530.

On the other hand, when the input voltage has a level that is less than the certain level, the control unit 500 may check a temperature of each of the first switching element 520 and the second switching element 530, and when the temperatures of both the switching elements 520 and 530 are different, the control unit 500 may provide a driving signal to a switching element having a low temperature and may provide a control signal for turning off a switching element having a high temperature. For example, when the temperature of the first switching element 520 is higher than the temperature of the second switching element 530, a control signal for turning the first switching element 520 off may be provided to the first switching element 520 to control the first switching element to not be driven, and a driving signal may be provided to the second switching element 530 to periodically turn the second switching element 530 on or off and control the second switching element 530 to output a certain output voltage.

When an input voltage has a level that is less than the certain level and temperatures of both switching elements 520 and 530 are not different (substantially the same), the control unit 500 may provide a driving signal to any switching element and may provide a control signal for turning another switching element off. Accordingly, even though temperatures of the switching elements 520 and 530 are not different, when an input voltage has a level that is less than the certain level, only one switching element may be controlled to operate.

Such control of the control unit 500 may be repeatedly performed at a certain period. That is, the operation of the control unit may be repeatedly performed according to a period of an input voltage.

As described above, in one embodiment of the present invention, when an applied voltage has a level that is a certain level or higher, all switching elements connected in parallel may be driven to respond to a high voltage, and when the applied voltage has a level that is less than the certain level, only a switching element having a low temperature among the switching elements connected in parallel is driven to divide a current flowing in the switching elements, thereby reducing the heat generated in the switching elements and increasing a high output maintaining time.

Figure 11:
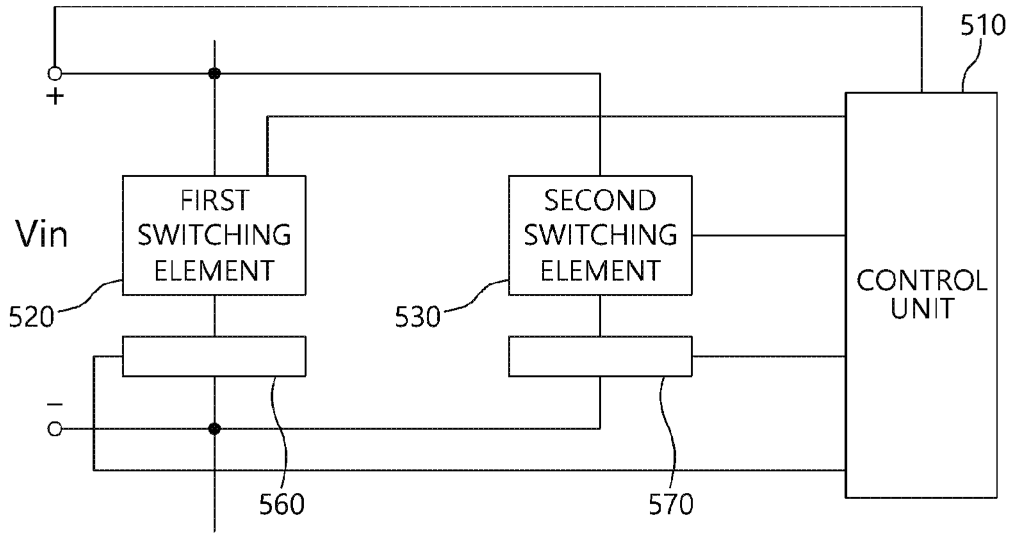
FIG. 11 illustrates a configuration of an inverter circuit in which switching elements are disposed in parallel according to one embodiment of the present invention.

FIG. 11 illustrates a configuration of an inverter circuit in which switching elements are disposed in parallel according to another embodiment of the present invention. FIG. 11 illustrates a portion of the entire inverter circuit as in FIG. 8 or 9.

As shown in the drawing, an inverter device according to one embodiment of the present invention may include a first switching element 520 and a second switching element 530 connected in parallel, a first current sensor 560, a second current sensor 570, and a control unit 510.

The first current sensor 560 may detect a current flowing in the first switching element 520 to provide a detection result to the control unit 510 periodically or in real time. The first current sensor 560 may be, for example, a current transformer type current sensor or a shunt resistor type current sensor, but the present invention is not limited thereto, and various types of current sensors may be used.

The second current sensor 570 may also detect a current flowing in the second switching element 530 to provide a detection result to the control unit 510 periodically or in real time. The second current sensor 570 may be a current transformer type current sensor or a shunt resistor type current sensor or may be a current sensor of another type.

When an input voltage of the first switching element 520 and the second switching element 530 has a level that is a certain level or higher, the control unit 510 according to another embodiment of the present invention may transmit a driving signal for driving both the first switching element 520 and the second switching element 530 connected in parallel. In addition, when the input voltage has a level that is less than the certain level, the control unit 510 may transmit a control signal for turning off a switching element in which a higher current flows among the first switching element 520 and the second switching element 530 and may transmit a driving signal for designating another switching element to be turned on or off. In this case, the certain level may be a preset value, for example, a level of 70% of a rated voltage. However, the present invention is not limited thereto, and the certain level may be set in various ways.

Specifically, the control unit 510 may check a level of an input voltage, and when the input voltage has a level that is the certain level or higher, the control unit 500 may transmit a driving signal for designating both the first switching element 520 and the second switching element 530 to be periodically turned on or off to each of the first switching element 520 and the second switching element 530.

On the other hand, when an input voltage input to the first switching element 520 and the second switching element 530 has a level that is less than the certain level, the control unit 510 may check a current flowing in each of the first switching element 520 and the second switching element 530. In this case, the control unit 510 may receive information about a current flowing in the first switching element 520 from the first current sensor 560 periodically or in real time and may also receive information about a current flowing in the second switching element 530 from the second current sensor 570 periodically or in real time.

When the currents flowing in both the switching elements 520 and 530 are different, the control unit 510 may provide a driving signal to a switching element in which a low current flows and may provide a control signal for turning off a switching element in which a large current flows. For example, when the current flowing in the first switching element 520 is higher than the current flowing in the second switching element 530, a control signal for turning the first switching element 520 off may be provided to the first switching element 520 to control the first switching element to not be driven, and a driving signal may be provided to the second switching element 530 to periodically turn the second switching element 530 on or off and control the second switching element 530 to output a certain output voltage.

When an input voltage has a level that is less than the certain level and currents flowing in both the switching elements 520 and 530 are not different (substantially the same), the control unit 510 may provide a driving signal to any switching element and may provide a control signal for turning another switching element off. Accordingly, even though currents flowing in the switching elements 520 and 530 are not different, when an input voltage has a level that is less than the certain level, only one switching element may be controlled to operate.

Such control of the control unit 510 may be repeatedly performed at a certain period. That is, since an input voltage may be a voltage having a certain period, the operation of the control unit 510 may be repeatedly performed according to the period of the input voltage.

As described above, according to another embodiment of the present invention, when an applied voltage has a level that is a certain level or higher, all switching elements connected in parallel may be driven to respond to a high voltage, and when the applied voltage has a level that is less than the certain level, only a switching element in which a low current flows among the switching elements connected in parallel is driven to divide a current flowing in the switching elements, thereby reducing the heat generated in the switching elements and increasing a high output maintaining time.

Although embodiments of the present invention have been described in detail, these are merely illustrative. It will be appreciated by those skilled in the art that various modifications and equivalents are possible from the embodiments. Therefore, the true technical protection scope of the present invention should be defined by the following claims.

INDUSTRIAL APPLICABILITY

A power conversion device, an electric range, and a method of controlling the same according to the present invention can be implemented in various home appliances and controllers for controlling the same used at home or industrial sites and thus have industrial applicability.

The invention claimed is:

1. An electric range comprising:

a plate on which an object to be heated is seated;

a working coil disposed under the plate and configured to heat the object to be heated using an induced current;

a voltage providing unit including a capacitor configured to provide an unsmoothed rectified voltage to the working coil, the unsmoothed rectified voltage having a cycle that repeatedly alternates between a first range and a second range;

a first switch switched to apply the unsmoothed rectified voltage to the working coil;

a second switch connected in parallel to the first switch; and a controller configured to control the first switch and the second switch, wherein the first range is defined as being equal to or higher than a preset voltage and the second range is defined as being less than the preset voltage, wherein the controller performs a first control and a second control repeatedly in a period based on repeating cycles of the unsmoothed rectified voltage, wherein the first control is defined to provide a driving signal to both the first switch and the second switch and is performed when the unsmoothed rectified voltage falls within the first range, wherein the second control is defined to provide a driving signal to one of the first switch and the second switch having a temperature that is lower than a temperature of an other one of the first switch and the second switch, to provide an off control signal to the other, and is performed when the unsmoothed rectified voltage falls within the second range.

2. The electric range of claim 1, wherein the second control is further defined to provide the driving signal to any one of the first switch and the second switch and to provide an off control signal to an other of the first switch and the second switch when the temperature of the first switch and the temperature of the second switch are the same.

3. An electric range comprising:

a plate on which an object to be heated is seated;

a working coil disposed under the plate and configured to heat the object to be heated using an induced current;

a voltage providing unit including a capacitor configured to provide an unsmoothed rectified voltage to the working coil, the unsmoothed rectified voltage having a cycle that repeatedly alternates between a first range and a second range;

a first switch switched to apply the unsmoothed rectified voltage to the working coil;

a second switch connected in parallel to the first switch; and a controller configured to control the first switch and the second, wherein the first range is defined as being equal to or higher than a preset voltage and the second range is defined as being less than the preset voltage, wherein the controller performs a first control and a second control repeatedly in a period based on repeating cycles of the unsmoothed rectified voltage, wherein the controller performs a third control and a fourth control repeatedly in a period the based on the repeating cycles of the unsmoothed rectified voltage, wherein the third control is defined to provide a driving signal to both the first switch and the second switch and is performed when the unsmoothed rectified voltage falls within the first range, wherein the fourth control is defined to provide a driving signal to one of the first switch and the second switch having a current that is lower than a current of an other one of the first switch and the second switch, to provide an off control signal to the other, and is performed when the unsmoothed rectified voltage falls within the second range.

4. The electric range of claim 3, wherein the fourth control is further defined to provide the driving signal to any one of the first switch and the second switch and to provide an off control signal to an other one of the first switch and the second switch when the current of the first switch and the current of the second switch are the same.

5. A power conversion device which performs switching to output an input voltage, the power conversion device comprising:

a first switch configured to constitute an arm element of the power conversion device;

a second switch connected in parallel to the first switch; and a controller configured to control the first switch and the second switch, wherein the input voltage has a cycle that repeatedly alternates between a first range and a second range, wherein the first range is defined as being equal to or higher than a preset voltage and the second range is defined as being less than the preset voltage, wherein the controller performs a first control and a second control repeatedly in a period based on repeating cycles of the input voltage, wherein the first control is defined to provide a driving signal to both the first switch and the second switch and is performed when the input voltage falls within the first range, wherein the second control is defined to provide a driving signal to one of the first switch and the second switch having a temperature that is lower than a temperature of an other one of the first switch and second switch, to provide an off control signal to the other one of the first switch and the second switch, and is performed when the input voltage falls within the second range.

6. The power conversion device of claim 5, wherein the second control is further defined to provide the driving signal to any one of the first switch and the second switch and to provide an off control signal to an other one of the first switch and the second switch when the temperature of the first switch and the temperature of the second switch are the same.

7. A power conversion device which performs switching to output an input voltage, the power conversion device comprising:

a first switch configured to constitute an arm element of the power conversion device;

a second switch connected in parallel to the first switch; and a controller configured to control the first switch and the second switch, wherein the input voltage has a cycle that repeatedly alternates between a first range and a second range, wherein the first range is defined as being equal to or higher than a preset voltage and the second range is defined as being less than the preset voltage, wherein the controller performs a first control and a second control repeatedly in a period based on repeating cycles of the input voltage, wherein the controller performs a third control and a fourth control repeatedly in a period based on the repeating cycles of the input voltage, wherein the third control is defined to provide a driving signal to both the first switch and the second switch and is performed when the input voltage falls within the first range, wherein the fourth control is defined to provide a driving signal to one of the first switch and the second switch having a current that is lower than a current of an other one of the first switch and the second switch, to provide an off control signal to the other, and is performed when the input voltage falls within the second range.

8. The power conversion device of claim 7, wherein the fourth control is further defined to provide the driving signal to any one of the first switch and the second switch and to provide an off control signal to an other one of the first switch and the second switch when the current of the first switch and the current of the second switch are the same.

9. A method of controlling a power conversion device for an electric range including a working coil, a voltage providing unit including a capacitor configured to provide an unsmoothed rectified voltage, a first switch switched to apply the unsmoothed rectified voltage to the working coil, and a second switch connected in parallel to the first switch, the method comprising:

starting to supply the unsmoothed rectified voltage, the unsmoothed rectified voltage having a cycle that repeatedly alternates between a first range and a second range, wherein the first range is defined as being equal to or higher than a preset voltage and the second range is defined as being less than the preset voltage;

performing a first control, the first control being defined to provide a driving signal to both the first switch and the second switch and is performed when the unsmoothed rectified voltage falls within the first range;

performing a second control, the second control being defined to provide a driving signal to one of the first switch and the second switch having a temperature that is lower than a temperature of an other one of the first switch and the second switch, to provide an off control signal to the other, and is performed when the unsmoothed rectified voltage falls within the second range; and repeating the first control and the second control in a period based on repeating cycles of the unsmoothed rectified voltage.

10. A method of controlling a power conversion device for an electric range including a working coil, a voltage providing unit including a capacitor configured to provide an unsmoothed rectified voltage, a first switch switched to apply the unsmoothed rectified voltage to the working coil, and a second switch connected in parallel to the first switch, the method comprising:

starting to supply the unsmoothed rectified voltage, the unsmoothed rectified voltage having a cycle that repeatedly alternates between a first range and a second range, wherein the first range is defined as being equal to or higher than a preset voltage and the second range is defined as being less than the preset voltage;

performing a first control, the first control being defined to provide a driving signal to both the first switch and the second switch and is performed when the unsmoothed rectified voltage falls within the first range; performing a second control, the second control being defined to provide a driving signal to one of the first switch and the second switch having a temperature that is lower than a temperature of an other one of the first switch and the second switch, to provide an off control signal to the other, and is performed when the unsmoothed rectified voltage falls within the second range;

performing a third control, the third control being defined to provide a driving signal to both the first switch and the second switch and is performed when the unsmoothed rectified voltage falls within the first range;

performing a fourth control, the fourth control being defined to provide a driving signal to one of the first switch and the second switch having a current that is lower than a current of an other one of the first switch and the second switch, to provide an off control signal to the other, and is performed when the unsmoothed rectified voltage falls within the second range; and repeating the third control and the fourth control in a period based on repeating cycles of the unsmoothed rectified voltage.

* * * * *